United States Patent
Chen et al.

(10) Patent No.: US 10,690,169 B2
(45) Date of Patent: Jun. 23, 2020

(54) CONNECTING APPARATUS AND BOLT ASSEMBLY

(71) Applicant: WINBO-Dongjian Automotive Technology Co.,Ltd., Foshan (CN)

(72) Inventors: Yongbo Chen, Foshan (CN); Wei Huang, Foshan (CN); Zhihai Zhang, Foshan (CN); Jie Yang, Foshan (CN); Weiting He, Foshan (CN)

(73) Assignee: WINBO-DONGJIAN AUTOMOTIVE TECHNOLOGY CO., LTD., Foshan (CN)

( * ) Notice: Subject to any disclaimer, the term of this patent is extended or adjusted under 35 U.S.C. 154(b) by 327 days.

(21) Appl. No.: 15/851,717

(22) Filed: Dec. 21, 2017

(65) Prior Publication Data

US 2018/0180084 A1 Jun. 28, 2018

(30) Foreign Application Priority Data

Dec. 22, 2016 (CN) .......................... 2016 1 1198754

(51) Int. Cl.
| | |
|---|---|
| *F16B 33/00* | (2006.01) |
| *B62D 27/06* | (2006.01) |
| *F16B 37/00* | (2006.01) |
| *F16B 5/02* | (2006.01) |
| *F16B 35/06* | (2006.01) |

(52) U.S. Cl.
CPC .......... *F16B 33/002* (2013.01); *B62D 27/065* (2013.01); *F16B 5/02* (2013.01); *F16B 35/06* (2013.01); *F16B 37/00* (2013.01); *F16B 33/00* (2013.01)

(58) Field of Classification Search
CPC .......... F16B 5/02; F16B 33/00; F16B 33/002; F16B 35/06; F16B 37/00; F16B 43/025; B62D 27/065
USPC .................................................. 411/400, 401
See application file for complete search history.

(56) References Cited

U.S. PATENT DOCUMENTS

| 1,358,683 A | 11/1920 | Lyon et al. | |
| 1,358,688 A * | 11/1920 | Lyon ..................... | B60R 19/285 |
| | | | 293/140 |

(Continued)

FOREIGN PATENT DOCUMENTS

| CN | 205744736 U | 11/2016 |
| GB | 405203 A | 2/1934 |
| WO | 2012013584 A1 | 2/2012 |

*Primary Examiner* — Roberta S Delisle

(57) ABSTRACT

A connecting apparatus and a bolt assembly are provided. The connecting apparatus includes a first connector defining a first through-hole, a second connector defining a second through-hole, a stopping member defining a stopping hole, an L-shaped bolt and a nut fitted about the L-shaped bolt. The L-shaped bolt includes a screw and an elbow connecting to the screw, wherein the elbow has a stopping surface extending along a lengthwise direction of the elbow, the L-shaped bolt is extended through the first through-hole, the stopping hole and the second through-hole successively and matches with the nut to connect the first connector and the second connector together, when the nut is rotated into the screw, the stopping surface and an inner wall of the stopping hole cooperate with each other to prevent the L-shaped bolt from rotating along an axis of the screw.

17 Claims, 8 Drawing Sheets

(56) References Cited

U.S. PATENT DOCUMENTS

| | | | |
|---|---|---|---|
| 1,910,249 A * | 5/1933 | Himmel | E06B 1/38 |
| | | | 52/223.9 |
| 1,955,353 A * | 4/1934 | Wiley | F16B 35/06 |
| | | | 411/400 |
| 2,379,752 A * | 7/1945 | Schultz | F16B 35/06 |
| | | | 403/299 |
| 3,185,269 A * | 5/1965 | Nagin | F16B 35/06 |
| | | | 52/489.1 |
| 3,303,735 A * | 2/1967 | Fisher | F16B 35/06 |
| | | | 411/400 |
| 3,463,525 A * | 8/1969 | Stewart | B61D 23/00 |
| | | | 403/288 |
| 4,131,204 A * | 12/1978 | Jacoby | A47B 57/485 |
| | | | 211/192 |
| 5,509,767 A * | 4/1996 | Easton | B65G 21/06 |
| | | | 411/400 |
| 6,077,014 A * | 6/2000 | Gulistan | F16B 39/10 |
| | | | 411/169 |
| 2005/0192225 A1 | 9/2005 | Bowen | |

* cited by examiner

CONNECTING APPARATUS AND BOLT ASSEMBLY

CROSS REFERENCE TO RELATED APPLICATIONS

This application claims priority to Chinese Patent Application No. 201611198754.8 filed on Dec. 22, 2016, which are hereby incorporated by reference herein as if set forth in its entirety.

TECHNICAL HELD

The present disclosure generally relates to connecting structures, and more particular relates to a connecting apparatus and a bolt assembly.

BACKGROUND

With the rapid development of economy, people's car ownership is also increasing year by year, accordingly, the needs of installing automobile accessories with different functions are also increasing. Currently, mounting and fastening methods in automobile industry commonly include: bolt and nut connection, welding nut and bolt connection, rivet connection and self tapping screw connection, etc. However, when a side of a connector is closed and the bolt cannot be put into the inner space, the mounting will be greatly limited.

In the related art, the connecting assemblies commonly used in the semi closed fastening structure or completely closed fastening structure include: T-shaped bolts and hook bolts. However, T-shaped bolt requires a certain size of the aperture of the connector, and the T-shaped bolt would rotate when fastened, which would has a low mounting efficiency. About hook bolts, after the hook of the hook bolt hooks the connector the hook bolt cannot be pulled out along the axial direction of the hook bolt, thus the connectors to be connected could be mounted together. However, when the nut is rotated into the bolt, the bolt would rotates with the rotation of the nut, resulting in a tedious mounting steps and a low mounting efficiency.

DETAILED DESCRIPTION

For a thorough understanding of the present disclosure, numerous specific details are set forth in the following description for purposes of illustration but not of limitation, such as particularities of system structures, interfaces, techniques, et cetera. However, it should be appreciated by those of skill in the art that, in absence of these specific details, the present disclosure may also be carried out through other implementations. In other instances, a detailed description of well-known devices, circuits, and methods is omitted, so as to avoid unnecessary details from hindering the description of the disclosure.

Figure 1:
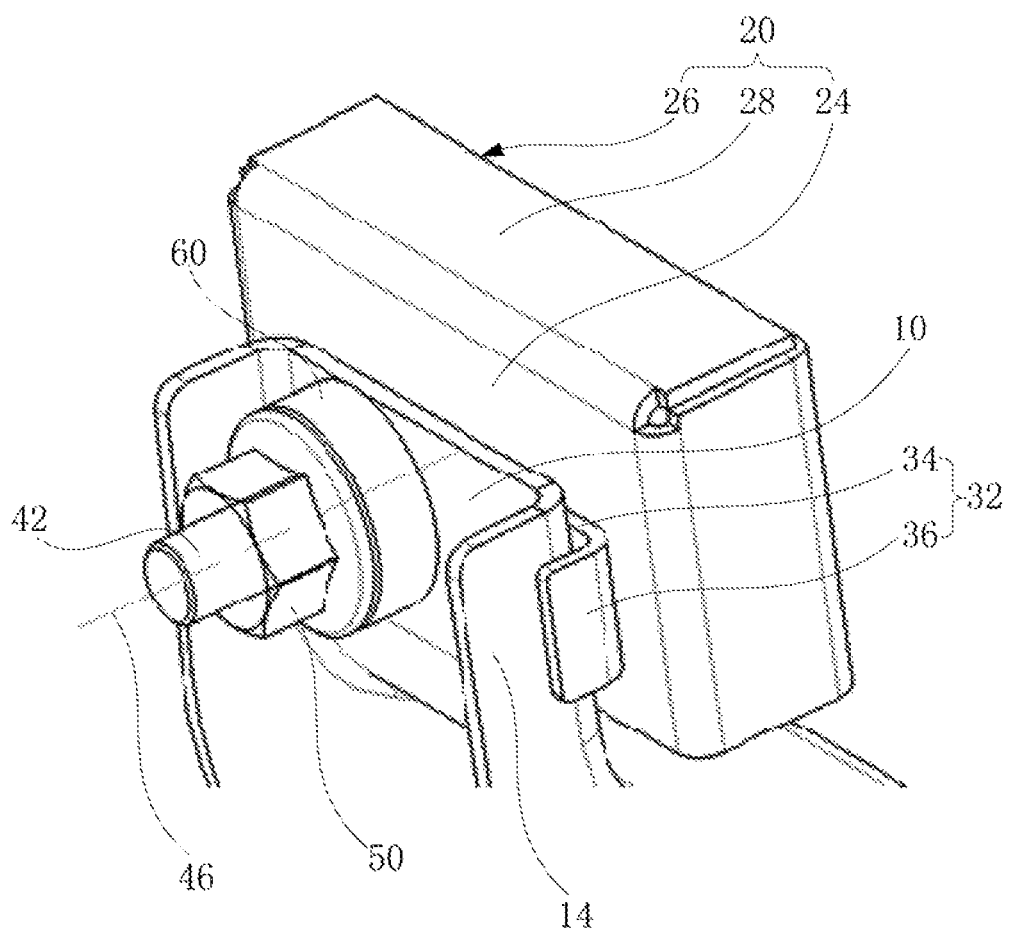
FIG. 1 is a schematic diagram of a connecting apparatus according to an exemplary embodiment of the present disclosure.

Referring to FIG. 1, the connecting apparatus may include a first connector 10, a second connector L-shaped bolt 40 and a nut 50 fitted about the L-shaped bolt 40 to connect the first connector 10 and the second connector 20 together.

Figure 2:
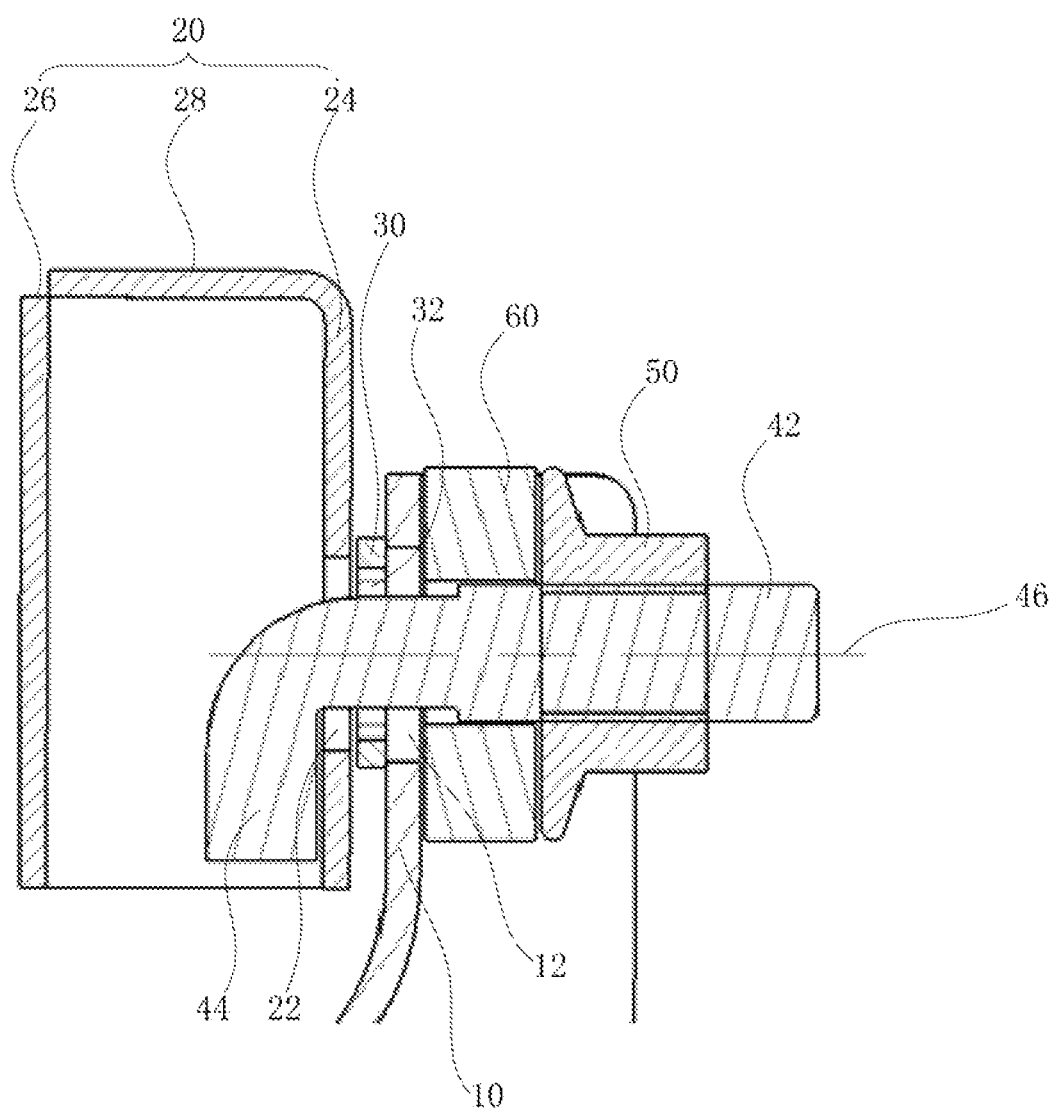
FIG. 2 is a cross section view of the connecting apparatus according to an exemplary embodiment of FIG. 1.
Figure 3:
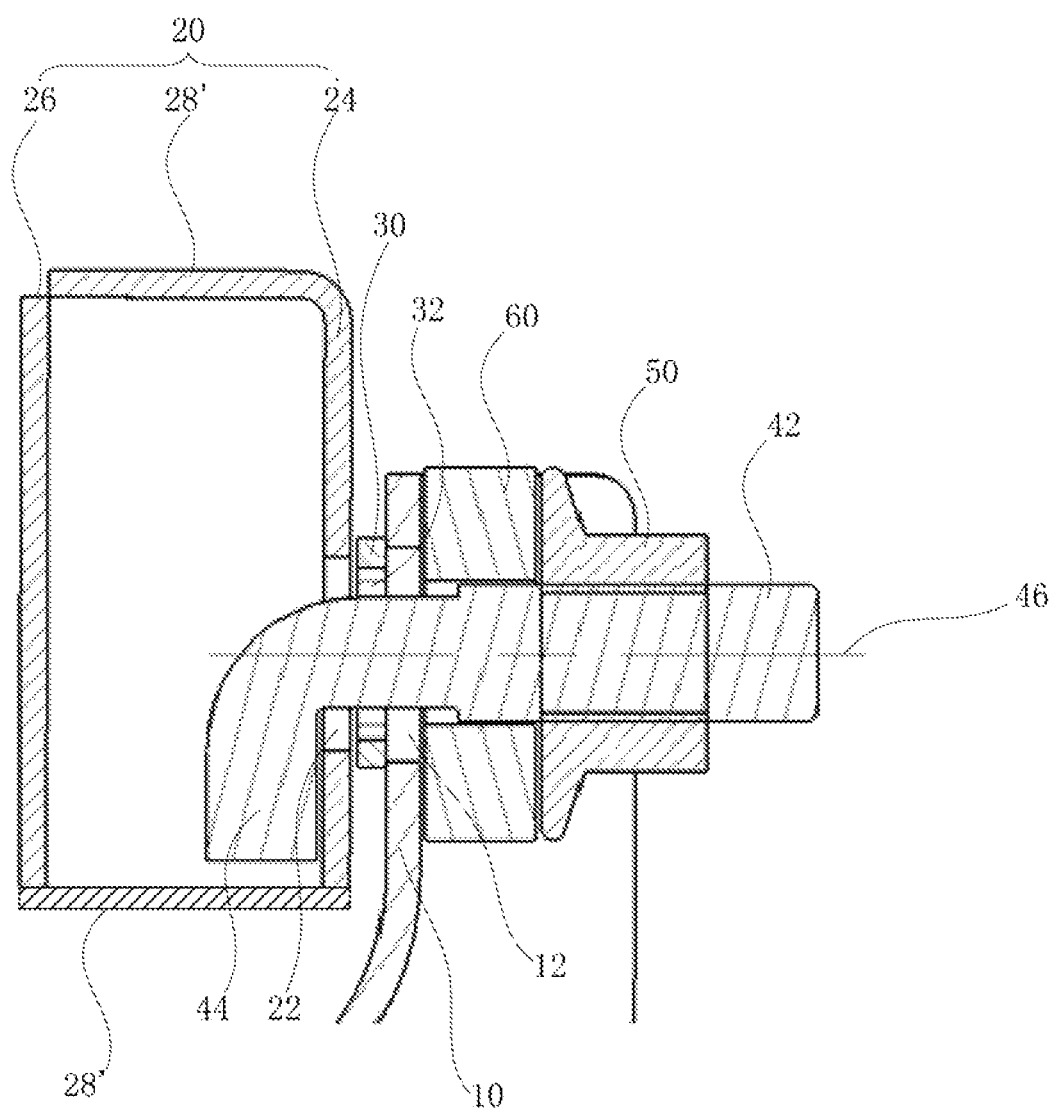
FIG. 3 is a cross section view of the connecting apparatus according to another exemplary embodiment of FIG. 1.

In this embodiment, the first connector 10 and the second connector 20 may be components of an auto. In other embodiments, the first connector 10 and the second connector 20 may also be components of other mechanisms. The first connector 10 may have a configuration of plate, the second connector 20 may have a semi closed structure. Combining with FIG. 2, the semi closed structure may include a connecting plate 24 defining the second through-hole 22, a cover plate 26 relative to the connecting plate 2d and a side wall 28 connecting the connecting plate 24 and the cover plate 26, the side wall 28 may not completely close the edge of the connecting plate 24 and the cover plate 26. In another embodiment, as shown in FIG. 3, the second connector 20 may have a completely closed structure, that is, the side wall 28' may extend to close all the edge of the connecting plate 24 and the cover plate 26. In still other embodiments, both the first connector and the second connector may have configurations of plate.

Specifically, the first connector 10 may define a first through-hole 12, the second connector 20 may define a second through-hole 22, and the stopping member 30 may define a stopping hole 32. The L-shaped bolt 40 may be extended through the first through-hole 12, the stopping hole 32 and the second through-hole 22 successively and match with the nut 50 to connect the first connector 10 and the second connector 20 together.

Figure 4:
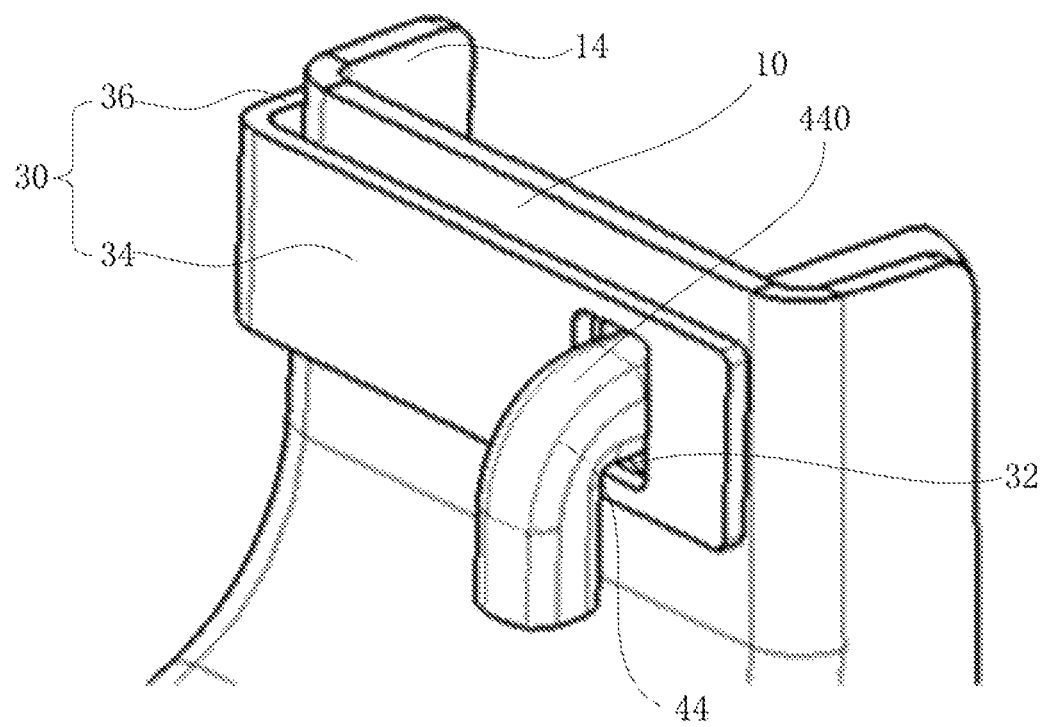
FIG. 4 is schematic diagram of the connecting apparatus in a state when the stopping member and the first connector are mounted together via an L-shaped bolt and a nut according to an exemplary embodiment of the present disclosure.
Figure 5:
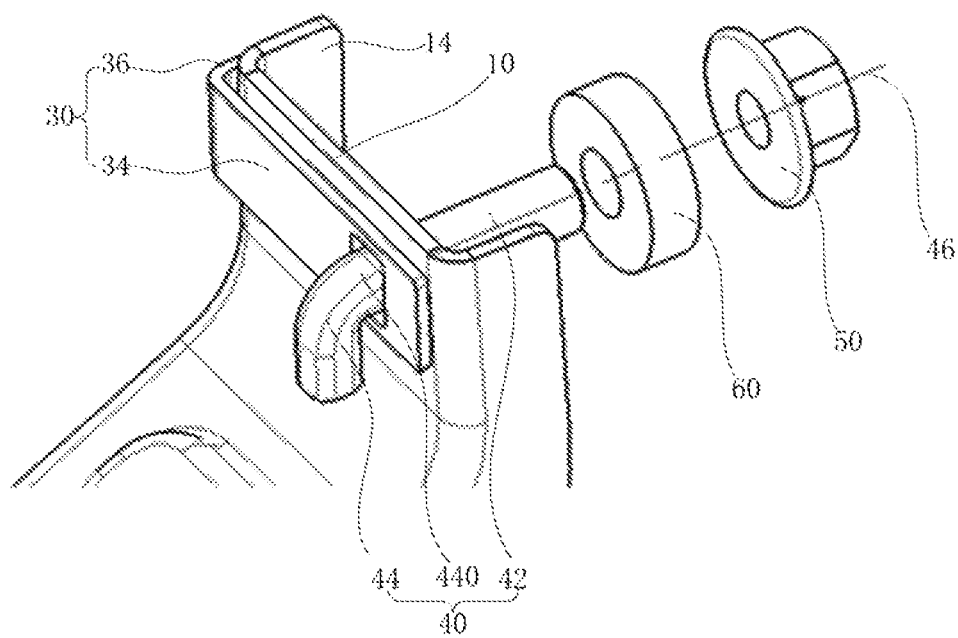
FIG. 5 is an explosive view of FIG. 4.

As shown in FIGS. 4-5, in this embodiment, the L-shaped bolt 40 may include a screw 42 and an elbow 14 connecting to the screw 42. The nut 50 may be fitted about the screw 42 and fastened with the screw 42 through threaded connection. The elbow 44 may have a stopping surface 440 extending along a lengthwise direction of the elbow 44. The stopping surface 440 may make the cross section of the elbow 44 has a non-circular shape, such as, square, rectangle, triangle, ellipse or other special-shapes. In this embodiment, the cross section of the elbow 44 having the stopping surface 440 has a square shape with rounded corners.

The stopping member 30 may be configured to prevent the L-shaped bolt 40 from rotating when the nut 50 is rotated into the screw 42. On one hand, the stopping member 30 may not rotate relative to the first connector 10 or the second connector 20, on the other hand, the stopping member 30 may keep the L-shaped bolt 40 from rotating relative to the stopping member 30.

Specifically, the stopping member 30 may include a connecting part 34 and a positioning part 36 arranged on the connecting part 34. The stopping member 30 may be prevented from rotating by the positioning part 36 matching with and cooperating with at least one of the first connector 10 and the second connector 20. For example, in this embodiment, the positioning part 36 may bend from an end of the connecting part 34 and be about perpendicular to the connecting part 34, which may make the stopping member present an "L" configuration. The first connector 10 may include a bending part 14, the positioning part 36 may abut on the bending part 14, thus the stopping member 30 could not rotate relative to the first connector 10. In another embodiment, the bending part may be provided on the second connector, and the positioning part may abut on the bending part of the second connector. In still another embodiment, the positioning part may be a bulge protruding from the connecting part, the surface of the at least one of the first connector and the second connector may define a slot, the bulge may match with the slot to limit the position of the stopping member.

The connecting part 34 may define the stopping hole 32. The stopping hole 32 may have a non-circular shape, such as, square, rectangle, triangle, ellipse, special-shapes or other shapes which has the stopping function. The inner wall of the stopping hole 32 may cooperate with the stopping surface 440 to prevent the L-shaped bolt 40 from rotating along the axis 46 of the screw 42. The stopping hole 32 of this embodiment may present a rectangle shape. In this embodiment, the shape of the stopping hole 32 may be different from that of the cross section of the elbow 44, while in other embodiment, the shape of the stopping hole 32 may be the same as that of the cross section of the elbow 44.

In order to realize the stopping function, the cross section of the elbow and the stopping hole may meet a certain relationships. In this embodiment, the relationship may be:

$b=a+0.4$ or $b \approx a+0.4,$ and $b<e=\sqrt{2}(a-2r)+2r$

Figure 6:
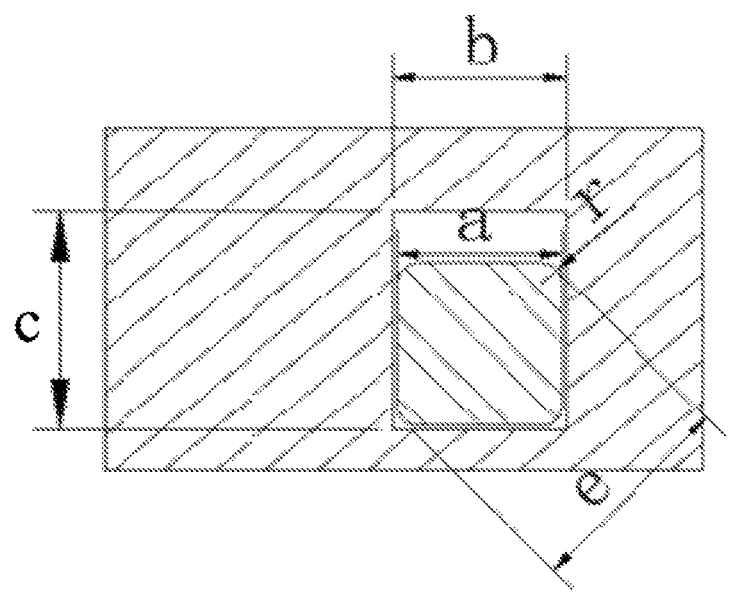
FIG. 6 is a cross section view of the stopping member and the L-shaped bolt according to an exemplary embodiment of the present disclosure.

In the relationships above, as shown in FIG. 6, a is the length of the square, r is the radius of the rounded corners, e is the diagonal length of the square, b is the width of the stopping hole. Specifically, Calculating according to the formula above, $b<e=\sqrt{2}a-0.828r$, that is, $r<(\sqrt{2}a-b)/0.828$, in one embodiment, if a=8 mm, thus b=8.4 mm, r<3.5 mm.

In addition, the length "c" of the rectangle (or the stopping hole 32) must be larger than the external bending radius of the L-shaped bolt, such that the L-shaped bolt 40 could turn in the plane which both the screw 42 and the elbow 44 are located in. In fact, in order to meet the requirement above, the length of the rectangle could be lengthened, which may not affect the fastening performance and stability after locked.

In other embodiments, the cross section of the elbow and the stopping hole may present other shapes, but the principle of stopping function may be similar to the embodiment mentioned above, which is not recited herein.

The nut 50 in this embodiment may be an enlarged flange nut, which could enlarge the contact area between the nut 50 and the first connector 10, so as to increase the anti loose friction force, thereby increasing the locking torque to prevent loosening.

Figure 7:
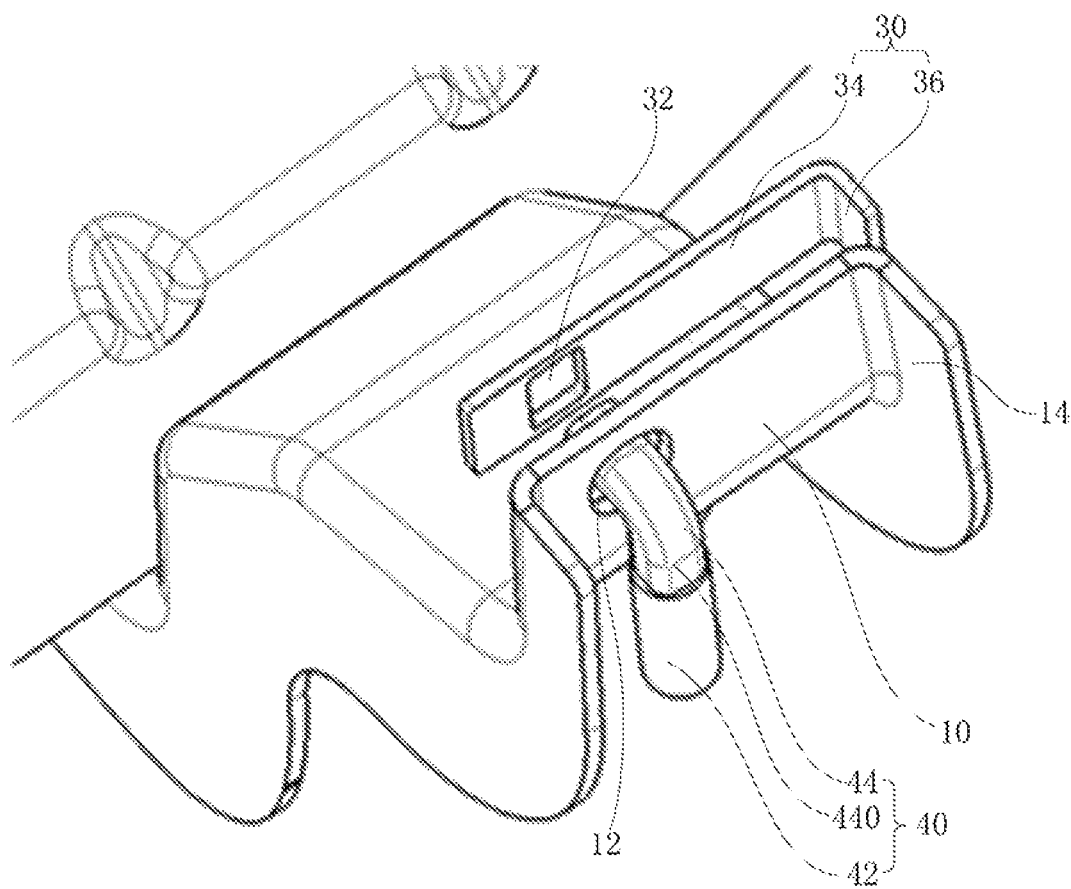
FIG. 7 is a schematic diagram of a connecting apparatus in a state before the elbow is inserted into the stopping hole according to an exemplary embodiment of the present disclosure.

Referring to FIG. 7, dining connecting the first connector 10 and the second connector 20, the elbow 44 of the L-shaped bolt 40 may be perpendicularly inserted into the first through-hole 12, the stopping hole 32 and the second through-hole successively. Then the L-shaped bolt 40 may be rotated 90° in the plane which both the screw 42 and the elbow 44 are located in, such that the screw 42 of the L-shaped bolt 40 is perpendicular to the plane which the first through-hole 12 are defined in. Finally, the nut 50 is rotated into the screw 42 to fasten the first connector 10 and the second connector 20 together.

In order to further increase the anti loose friction force, a washer 60 may be arranged between the first connector 10 and the nut 50.

Compared with the related art, the connecting apparatus of the present disclosure could be suitable for mounting a connector on another connector having semi closed structure or completely closed structure, and is more widely used than the T-shaped bolt. Furthermore, the stopping hole of the present disclosure is defined by the stopping member, such that the formation of the stopping hole could be simpler, the precision could be guaranteed and the processing cost can be reduced. In addition, the connecting apparatus of the present disclosure could hide the elbow in the closed structure, therefore the elbow would not be exposed outside of the connecting apparatus.

Figure 8:
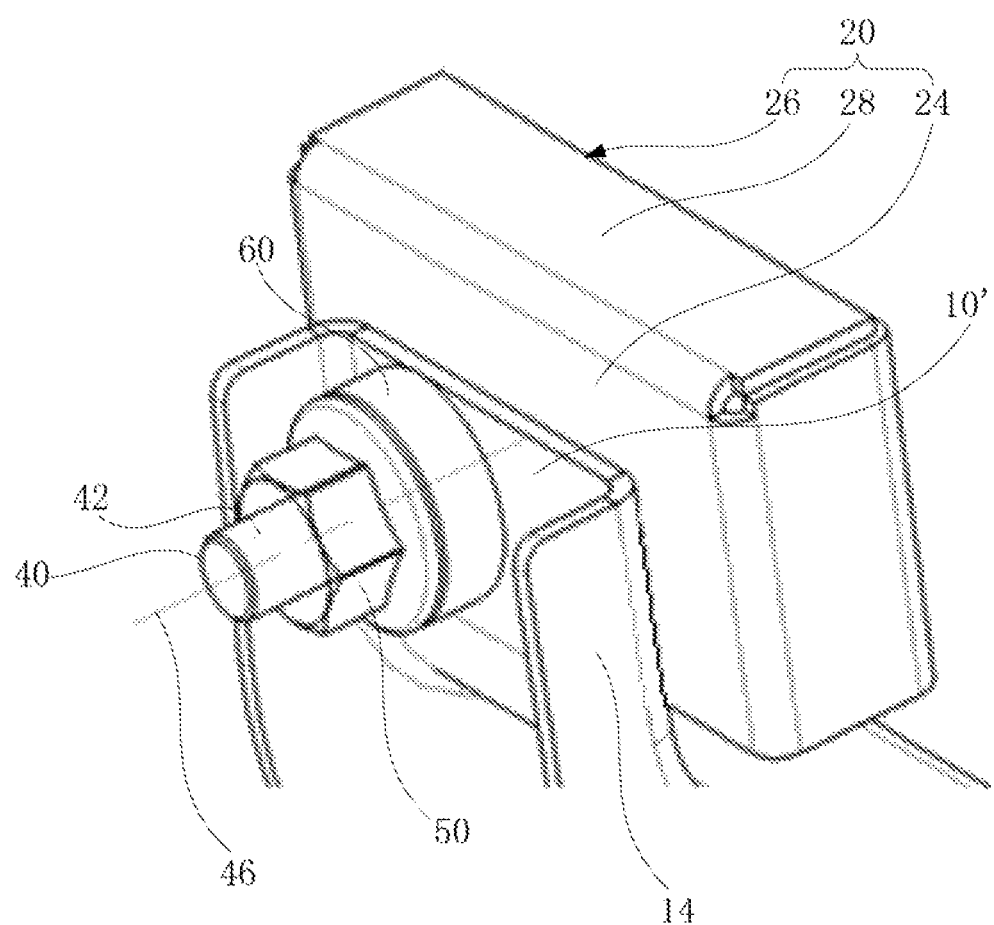
FIG. 8 is a schematic diagram of a connecting apparatus according to another exemplary embodiment of the present disclosure.
Figure 9:
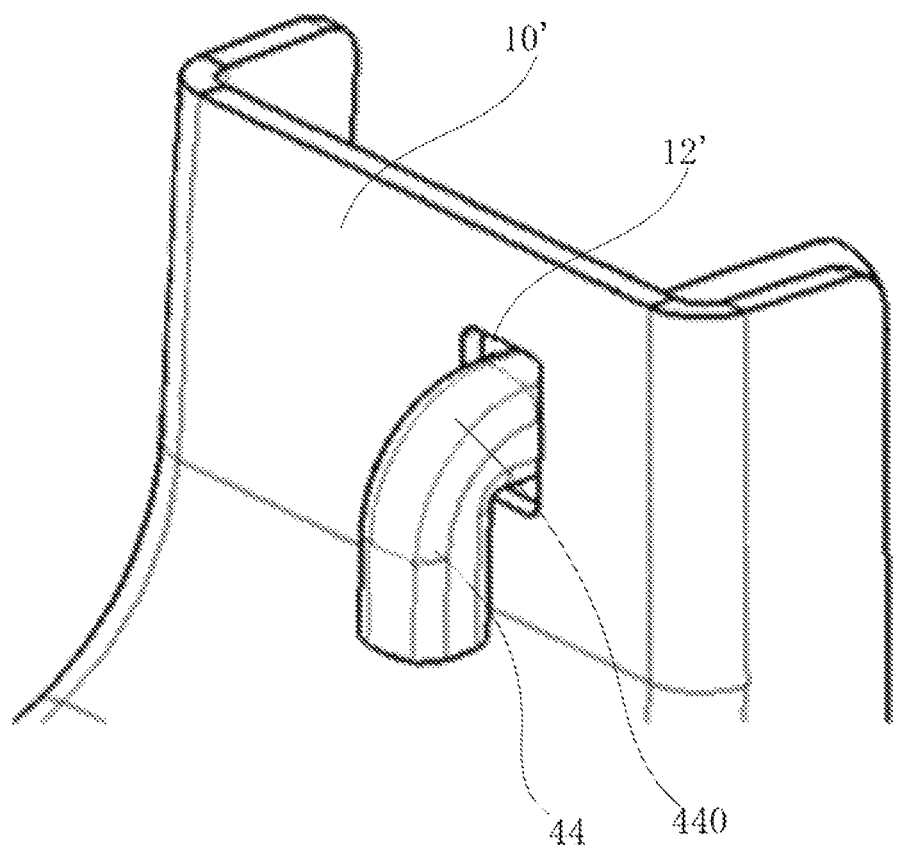
FIG. 9 is a schematic diagram of a connecting apparatus in a state when the L-shaped bolt is inserted into the stopping hole of the first connector according to another exemplary embodiment of the present disclosure.

Referring to FIGS. 8-9, the present disclosure may also provide another connecting apparatus, the connecting apparatus may include a first connector 10' defining a first through-hole 12', a second connector 20 defining a second through-hole 22, an L-shaped bolt 40 including a screw 42 and an elbow 44 connecting to the screw 42, and a nut 50 fitted about the screw 42.

The elbow 44 may have a stopping surface 440 extending along a lengthwise direction of the elbow 44. At least one of the first through-hole 12' and the second through-hole 22 may be a stopping hole, in this embodiment, the first through-hole 12' is the stopping hole. The L-shaped bolt 40 may be extended through the first through-hole 12' and the second through-hole 22 and matches with the nut 50 to connect the first connector 10' and the second connector 20 together. When the nut 50 is rotated into the screw 42, the stopping surface 440 and an inner wall of the stopping hole cooperate with each other to prevent the L-shaped bolt 40 from rotating along an axis 46 of the screw 42.

The difference between this embodiment and embodiments mentioned above is the stopping hole is defined in the first connector 10' or the second connector 20, thus the stopping member could be omitted.

Compared with the related art, the connecting apparatus of the present disclosure could be suitable for mounting a connector on another connector having semi closed structure or completely closed structure. And the connecting apparatus of the present disclosure could hide the elbow in the closed structure, therefore the elbow would not be exposed outside of the connecting apparatus.

The present disclosure may further provide a bolt assembly, as shown in FIGS. 1-5, the bolt assembly may include an L-shaped bolt 40, a nut 50 and a stopping member 30. The L-shaped bolt 40 may include a screw 42 and an elbow 44 connecting to the screw 42. The nut 50 may fit about the screw 42. The stopping member 30 may define a stopping hole 32. The elbow 44 may have a stopping surface 440 extending along a lengthwise direction of the elbow 44.

When the L-shaped bolt 40 is extended through the stopping hole 32 and the nut 50 is rotated into the screw 42, the stopping surface 440 and an inner wall of the stopping hole 32 cooperate with each other to prevent the L-shaped bolt 40 from rotating along an axis of the screw 42.

The stopping member 30 may include a connecting part 34 and a positioning part 36 arranged on the connecting part 34, the connecting part 34 may define the stopping hole 32, the positioning part 36 may match with at least one of elements to be connected, such as the first connector 10, to prevent the stopping member 30 from rotating when the nut 50 is rotated. In this embodiment, the positioning part 36 may bend from an end of the connecting part 34 and abut on a bending part 14 of the first connector 10.

Compared with the related art, the bolt assembly of the present disclosure could be suitable for mounting a connector on another connector having semi closed structure or completely closed structure. Furthermore, the stopping hole of the present disclosure is defined by the stopping member, such that the formation of the stopping hole could be simpler, the precision could be guaranteed and the processing cost can be reduced. In addition, the elbow of the bolt assembly of the present disclosure could be hidden in the closed structure, therefore the elbow would not be exposed outside of the connecting apparatus.

The above description depicts merely some exemplary embodiments of the disclosure, but is not meant to limit the scope of the disclosure. Any equivalent structure or flow transformation made to the disclosure, or any direct or indirect applications of the disclosure on other related fields, shall all be covered within the protection of the disclosure.

What is claimed is:

1. A connecting apparatus, comprising:
   a first connector, defining a first through-hole;
   a second connector, defining a second through-hole;
   a stopping member, defining a stopping hole;
   an L-shaped bolt, comprising a screw and an elbow connecting to the screw, wherein the elbow has a stopping surface extending along a lengthwise direction of the elbow; and
   a nut, fitted about the screw;
   wherein the L-shaped bolt is extended through the first through-hole, the stopping hole and the second through-hole successively and matches with the nut to connect the first connector and the second connector together, when the nut is rotated into the screw, the stopping surface and an inner wall of the stopping hole cooperate with each other to prevent the L-shaped bolt from rotating along an axis of the screw; wherein the stopping member comprises a connecting part and a positioning part arranged on the connecting part, the connecting part defines the stopping hole, the positioning part matches with at least one of the first connector and the second connector to prevent the stopping member from rotating when the nut is rotated.

2. The connecting apparatus according to claim 1, wherein the positioning part bends from an end of the connecting part;
   the at least one of the first connector and the second connector comprises a bending part, the positioning part abuts on the bending part.

3. The connecting apparatus according to claim 2, wherein the second connector at least has a semi closed structure comprising a connecting plate defining the second through-hole, a cover plate relative to the connecting plate and a side wall connecting the connecting plate and the cover plate.

4. The connecting apparatus according to claim 3, wherein the second connector has a completely closed structure, the side wall closes the edge of the connecting plate and the cover plate.

5. The connecting apparatus according to claim 1, wherein a cross section of the elbow having the stopping surface has a non-circular shape.

6. The connecting apparatus according to claim 5, wherein the cross section of the elbow having the stopping surface has a shape of square, rectangle or triangle.

7. The connecting apparatus according to claim 5, wherein the cross section of the elbow having the stopping surface is a square with rounded corners, the stopping hole has a rectangle shape, the cross section of the elbow and the stopping hole meet a following relationships:

$$b=a+0.4$$

$$b<e=\sqrt{2}(a-2r)+2r$$

wherein a is a length of the square, r is a radius of the rounded corners, e is a diagonal length of the square, b is a width of the stopping hole.

8. The connecting apparatus according to claim 1, wherein further comprising a washer arranged between the first connector and the nut.

9. The connecting apparatus according to claim 1, wherein the nut is a flange nut.

10. A connecting apparatus, comprising:
    a first connector, defining a first through-hole;
    a second connector, defining a second through-hole;
    an L-shaped bolt, comprising a screw and an elbow connecting to the screw, wherein the elbow has a stopping surface extending along a lengthwise direction of the elbow; and
    a nut, fitted about the screw;
    wherein at least one of the first through-hole and the second through-hole is a stopping hole, the L-shaped bolt is extended through the first through-hole and the second through-hole and matches with the nut to connect the first connector and the second connector together, when the nut is rotated into the screw, the stopping surface and an inner wall of the stopping hole cooperate with each other to prevent the L-shaped bolt from rotating along an axis of the screw; wherein the second connector at least has a semi closed structure comprising a connecting plate defining the second through-hole, a cover plate relative to the connecting plate and a side wall connecting the connecting plate and the cover plate.

11. The connecting apparatus according to claim 10, wherein a cross section of the elbow having the stopping surface has a non-circular shape.

12. The connecting apparatus according to claim 11, wherein the cross section of the elbow having the stopping surface has a shape of square, rectangle or triangle.

13. The connecting apparatus according to claim 11, wherein the cross section of the elbow having the stopping surface is a square with rounded corners, the stopping hole has a rectangle shape, the cross section of the elbow and the stopping hole meet a following relationships:

$$b=a+0.4$$

$$b<e=\sqrt{2}(a-2r)+2r$$

wherein a is a length of the square, r is a radius of the rounded corners, e is a diagonal length of the square, b is a width of the stopping hole.

14. The connecting apparatus according to claim 10, wherein the second connector has a completely closed structure, the side wall closes the edge of the connecting plate and the cover plate.

15. The connecting apparatus according to claim 10, wherein further comprising a washer arranged between the first connector and the nut.

16. A bolt assembly, comprising:
- an L-shaped bolt, comprising a screw and an elbow connecting to the screw, wherein the elbow has a stopping surface extending along a lengthwise direction of the elbow;
- a nut, fitted about the screw; and
- a stopping member, defining a stopping hole, wherein when the L-shaped bolt is extended through the stopping hole and the nut is rotated into the screw, the stopping surface and an inner wall of the stopping hole cooperate with each other to prevent the L-shaped bolt from rotating along an axis of the screw;
- wherein the stopping member comprises a connecting part and a positioning part arranged on the connecting part, the connecting part defines the stopping hole, the positioning part matches with at least one of elements to be connected to prevent the stopping member from rotating when the nut is rotated.

17. The bolt assembly according to claim 16, wherein the positioning part bends from an end of the connecting part and abuts on a bending part of the element to be connected.

\* \* \* \* \*